(12) United States Patent
Butz et al.

(10) Patent No.: US 6,314,350 B1
(45) Date of Patent: Nov. 6, 2001

(54) METHODS AND APPARATUS FOR GENERATING MAINTENANCE MESSAGES

(75) Inventors: Mark G. Butz; Richard F. Schuster, both of Loveland, OH (US)

(73) Assignee: General Electric Company, Cincinnati, OH (US)

( * ) Notice: Subject to any disclaimer, the term of this patent is extended or adjusted under 35 U.S.C. 154(b) by 0 days.

(21) Appl. No.: 09/451,435

(22) Filed: Nov. 30, 1999

(51) Int. Cl.[7] ........................................ G06F 7/00
(52) U.S. Cl. .................... 701/34; 701/35; 701/9; 701/14; 340/945
(58) Field of Search .................. 701/34, 14, 35, 701/3, 8, 9; 340/945, 959, 960, 963; 434/29

(56) References Cited

U.S. PATENT DOCUMENTS 5,260,874 * 11/1993 Berner et al. ........................ 701/14
5,454,074 * 9/1995 Hartel et al. ......................... 395/161
5,912,627 * 6/1999 Alexander ......................... 340/815.4

* cited by examiner

Primary Examiner—Yonel Beaulieu
(74) Attorney, Agent, or Firm—Andrew C. Hess; William Scott Andes

(57) ABSTRACT

Sensor selection status monitoring and maintenance logic for generating messages relating to intermittent and "in-range" faults are described. In one embodiment, a transition count is generated indicating a number of times the selection status number changes during a flight. A time duration table is generated indicating an amount of time a selection status number is recorded in each of its possible states during the flight. The maintenance logic utilizes outputs from the monitoring logic to generate maintenance messages.

13 Claims, 5 Drawing Sheets

METHODS AND APPARATUS FOR GENERATING MAINTENANCE MESSAGES

BACKGROUND OF THE INVENTION

This invention relates generally to monitoring operation of an engine and, more particularly, to monitoring operation of an engine and generating maintenance messages for both out-of-range and in-range fault conditions.

Engine control units (ECUs) detect sensor system problems and generate maintenance messages using hardware and software optimized for capturing hard faults, i.e. open or short circuit conditions that remain unchanged for an extended period of time. Typically a hard fault results from a mechanical problem in a sensor, a cable, or the ECU data acquisition hardware. The ECU has validation logic which sets a validation flag to an INVALID state if a signal is "out-of-range".

The ECU also has sensor selection logic which monitors the validation flags of input signals and selects a best signal for use by the engine control logic. For example, if a validation flag for one sensor is set to INVALID and dual sensor inputs are provided to the ECU, the ECU sensor selection logic checks the validity of the other sensor. If the validation flag of the other sensor is set to VALID, then the sensor selection logic selects the signal from this "in range" sensor. If both sensors fail, i.e., both flags are set to INVALID, or if a second sensor is not available, then the ECU sensor selection logic selects a model or fail-safe value. If the validation flags for both sensors are set to VALID, then the selected value is typically the average of the two sensor values.

The sensor selection logic also generates a selection status (SST) number which indicates a type of fault accommodation that has been taken. The SST number is then used by maintenance logic to generate maintenance messages. Specifically, if a fault condition SST number is set for a specific period of time, generally referred to as a persistence time, then a maintenance message is transmitted to an aircraft central maintenance system. Post-flight maintenance actions typically are based on these messages.

The above described ECU does not generate maintenance messages for fault conditions due to intermittent mechanical problems or for many "in-range" fault conditions. Maintenance messages are not generated for intermittent conditions since under such conditions, the signal does not remain in the "out-of-range" state for a time period greater than the persistence time requirement (typically 10 seconds). Maintenance messages also are not generated for many faults that cause the signal to shift but remain "in-range", i.e., in-range faults. Therefore, for such faults, the validation logic flag will not be set to an INVALID state and the sensor selection logic will select the shifted signal unless a difference test can be made using another sensor. Even if a second sensor is available and the sensor selection logic sensor-to-sensor difference limit is exceeded, a maintenance message may still not be generated since the shifted signal must remain shifted for a time period greater than the persistence time requirement. This type of signal variability is possible since "in-range" faults are typically caused by a time-varying resistance in series with the input signal or between the signal line and ground.

By not having the ability to generate maintenance messages for these fault conditions, i.e., faults due to intermittent conditions and "in-range" faults, the ability to trend a fault condition and predict when a hard fault will occur is not available. This prediction capability is particularly useful for maintenance planning since many engine fault conditions are capable of causing aircraft delays and cancellations.

BRIEF SUMMARY OF THE INVENTION

Sensor selection status monitoring and maintenance logic for generating messages relating to intermittent and "in-range" faults are described. In one embodiment, the monitoring logic utilizes a SST number from current sensor selection logic. Specifically, a current value of the SST number is compared with a previous value in order to generate a transition count indicating a number of times the SST number changes during a flight. The monitoring logic also generates a time duration table indicating an amount of time the SST number is recorded in each of its possible states during the flight.

The maintenance logic utilizes outputs from the monitoring logic to generate maintenance messages. More specifically, the maintenance logic utilizes the SST number transition counter output to generate a real-time maintenance message if the transition counter number exceeds a threshold limit. The SST number time duration table also is used by the maintenance logic to detect a pattern from the table information so a type of fault can be automatically detected and to generate an appropriate post-flight maintenance message.

DETAILED DESCRIPTION OF THE INVENTION

Figure 1:
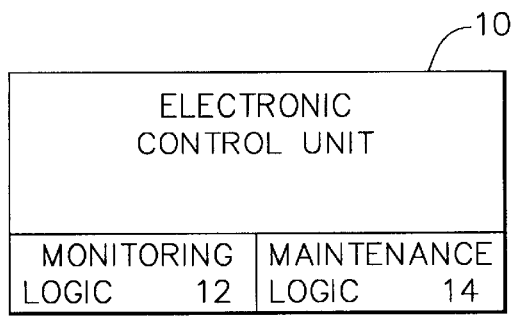
FIG. 1 is a block diagram of an electronic control unit.

FIG. 1 is a block diagram of an electronic control unit (ECU) 10. Unit 10 includes monitoring logic 12 and maintenance logic 14. Logic 12 and 14 may, for example, be stored in a non-volatile memory of ECU 10 and, as described below in more detail, are utilized for generating maintenance messages.

A SST number is generated by sensor selection logic in ECU 10. Table I illustrates a typical sensor selection logic diagram for a dual sensor, dual processor system. Each processor acquires validation information from its local sensor and from the cross-channel sensor. Depending upon the state of the validation flags, the selected value and SST number are determined.

TABLE I

Absolute (Local Sensor

| Local Sensor = VALID | Cross Channel Sensor = VALID | Value-Cross Channel Sensor Value) <= DIFFERENCE LIMIT | Selected Value | SST Number |
|---|---|---|---|---|
| T | T | T | Average (Local Sensor Value and Cross Channel Value) | 1 |
| T | T | F | Local Sensor if it is closest to Model Value | 2 |
| T | T | F | Cross Channel Sensor if it is closest to Model Value | 3 |
| F | T | X | Cross Channel Sensor Value. | 5 |
| T | F | X | Local Sensor Value | 6 |
| F | F | X | Fail safe or Model Value | 7 |

The SST number 4 is not used in the logic diagram shown in Table I. In an alternative embodiment, SST numbers 2 and 3 are replaced with SST number 4. In the alternative embodiment, SST number 4 generates a selected value equal to a fail-safe value. The alternative embodiment would be used, for example, if no model sensor value can be determined. The numerical range of the SST number can be greater than 7 for sensor systems with more than 2 inputs, or for systems requiring more complex selection logic.

Monitoring logic 12 monitors the SST number for each input sensor and records, in a transition counter, the number of times the SST value changes from its previous value during a flight. Monitoring logic 12 also monitors the SST number for each input sensor and generates a time duration table that indicates the total time that a SST value is recorded at each of its possible states during the flight. Maintenance logic 14 generates a real-time maintenance message when the transition counter value exceeds a specific threshold limit.

Figure 2:
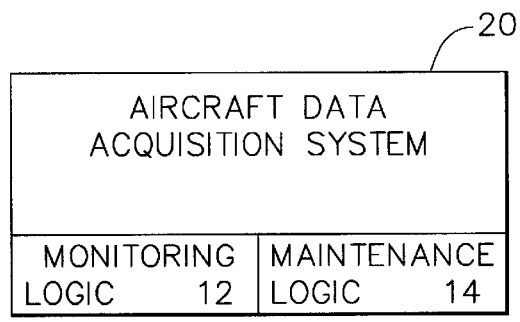
FIG. 2 is a block diagram of an aircraft data acquisition system.

FIG. 2 is a block diagram of an aircraft data acquisition system 20. Rather than being stored in ECU 10 (FIG. 1), monitoring logic 12 and maintenance logic 14 may be stored in system 20. As in ECU 10, logic 12 and 14 are stored in a non-volatile memory of system 20.

Figure 3:
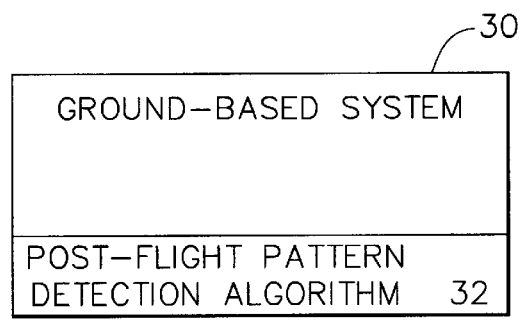
FIG. 3 is a block diagram of a ground-based system.

FIG. 3 is a block diagram of a ground-based system 30. A post-flight pattern detection algorithm 32 is stored in system 30 and, as described below in more detail, also generates maintenance messages. Algorithm 32 is stored in a non-volatile memory of system 30. Post-flight pattern detection algorithm 32 generates a post-flight maintenance message when a fault condition pattern is recognized in the time duration table data.

Figure 4:
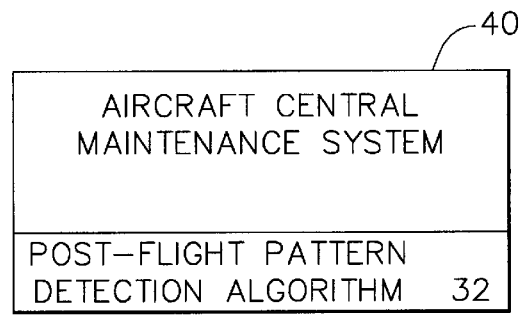
FIG. 4 is a block diagram of an aircraft central maintenance system.

FIG. 4 is a block diagram of an aircraft central maintenance system 40. Post-flight pattern detection algorithm 32 may be stored in aircraft central maintenance system 40 rather than in ground based system 30 (shown in FIG. 3) and, as described below in more detail, generates maintenance messages. Post-flight pattern detection algorithm 32 is stored in a non-volatile memory of aircraft central maintenance system 40. Post-flight pattern detection algorithm 32 generates a post-flight maintenance message when a fault condition pattern is recognized in the time duration table data.

Figure 5:
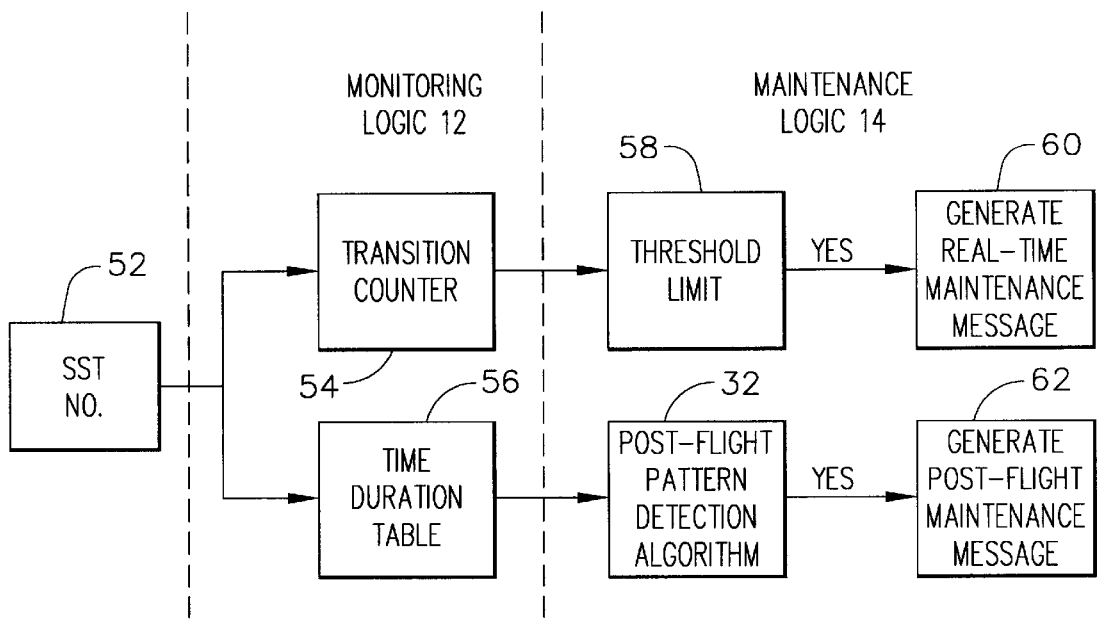
FIG. 5 is a logic diagram for monitoring logic and maintenance logic.

FIG. 5 is a logic diagram illustrating processing using monitoring logic 12 maintenance logic 14 and post-flight pattern detection algorithm 32. Generally, a SST number 52 is generated by the sensor selection logic, and a transition counter 54 increments every time a current SST number value changes from its previous value. Table II illustrates operation of transition counter 54 and how a count value is incremented if a local N2 sensor intermittently fails three times to an "out-of-range" invalid condition (SST Number= 5), while a cross-channel N2 sensor remains valid during a flight. A transition counter value is generated for each sensor.

TABLE II

| Time in seconds | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|
| N2 SST Number | 1 | 5 | 5 | 1 | 1 | 5 | 5 | 5 | 1 | 1 | 1 | 5 | 5 | 5 | 5 | 1 | 1 |
| Transition Counter Value | 0 | 1 | 1 | 2 | 2 | 3 | 3 | 3 | 4 | 4 | 4 | 5 | 5 | 5 | 5 | 6 | 6 |

Sensor SST number time duration table logic 56 uses the same SST number and creates a table indicating an amount of time that a SST number value is measured in each of its possible states. Table III illustrates a time duration table generated by logic 56 for a normal flight without any engine sensor problems.

TABLE III

| | SST Number | | | | | |
|---|---|---|---|---|---|---|
| Sensor | 1 | 2 | 3 | 5 | 6 | 7 |
| N1 | 999 | 0 | 0 | 0 | 0 | 0 |
| N2 | 999 | 0 | 0 | 0 | 0 | 0 |
| T25 | 999 | 0 | 0 | 0 | 0 | 0 |
| PS3 | 999 | 0 | 0 | 0 | 0 | 0 |
| T495 | 999 | 0 | 0 | 0 | 0 | 0 |

The values of 999 in the "SST Number=1" column represent an upper limit for the time value. Since the time values for the other SST number columns are all zero, the five sensors were always in the non-failed state during the flight.

Table IV illustrates a time duration table generated by logic 56 if a flight has an intermittent N2 sensor fault condition as represented by the transition counter data in Table II.

TABLE IV

| | SST Number | | | | | |
|---|---|---|---|---|---|---|
| Sensor | 1 | 2 | 3 | 5 | 6 | 7 |
| N1 | 999 | 0 | 0 | 0 | 0 | 0 |
| N2 | 999 | 0 | 0 | 9 | 0 | 0 |
| T25 | 999 | 0 | 0 | 0 | 0 | 0 |
| PS3 | 999 | 0 | 0 | 0 | 0 | 0 |
| T495 | 999 | 0 | 0 | 0 | 0 | 0 |

Table IV has a value of 9 in the "SST Number=5" column which indicates that there were 9 seconds during the flight when the local N2 sensor was invalid.

Maintenance logic 14 compares the transition counter values to a threshold limit 58, during the flight. If a counter value exceeds the limit 58, then a real-time maintenance message is generated 60 immediately. For example, for a flight that has an intermittent N2 sensor fault condition as represented in Table II, no maintenance message would be generated if the threshold limit is 6 or more. However, for that same flight, a maintenance message would be generated if the threshold limit is 5 or less.

With threshold limit 58 and maintenance logic 14 installed in ECU 10 (FIG. 1), the output of ECU 10 is a discrete signal indicating a specific fault condition. This information is transmitted from ECU (10) on a data bus. Aircraft data acquisition system 20 and aircraft central maintenance system 40 receive the information via the bus, and both systems 20 and 40 generate a maintenance message based on the specific fault condition. If threshold limit 58 and maintenance logic 14 are installed in aircraft data acquisition system 20, then the message would only be generated by system 20.

Post-flight pattern detection algorithm 32 utilizes data from SST number time duration table 56 to evaluate post-flight table data. Specifically, and in one embodiment, algorithm 32 eliminates data for all sensors having time duration data indicating that the sensors were always in a non-fail state during the flight. The remaining sensor data is evaluated for fault patterns. Upon identifying a fault pattern, a post-flight maintenance message 62 is generated.

For example, and based on the N2 sensor time duration data shown in Table IV, the N1, T25, PS3 and T495 sensors are eliminated from further processing since the data indicates that such sensors were always in a non-failed (SST Number=1) state and there were no other columns with non-zero time values. With respect to the N2 sensor, a value of 9 in the "SST Number=5" column indicates that the local N2 sensor system failed sometime during the flight. Since the value is not 999, this indicates that the failure was intermittent. Since there are no other columns with non-zero time values, the cross-channel sensor did not fail and there are no indications of an "in-range" failure. Such information is used to generate a post-flight maintenance message that focuses on the intermittent failure of the local channel N2 ensor system.

Pattern detection algorithm 32 utilizes the various combinations of sensor SST values for each of the SST number states. Table V shows possible combinations of SST number time duration table scenarios, and failure conditions that cause each scenario. The value of NNN in Table V indicates a time value in seconds. If the NNN value is 999 seconds, which is an upper limit of the time value, then the sensor system remained in that state for a significant period of the flight (e.g., greater than 16 minutes), which indicates a hard fault condition. If an NNN value is less than 10 seconds, then the ECU persistence time limit is not be exceeded and no ECU maintenance message is generated. There are cases in which the NNN value is greater than 10 seconds and no ECU maintenance message is generated. These cases are caused by intermittent signals that do not remain failed for more than a 10-second period.

Figure 6:
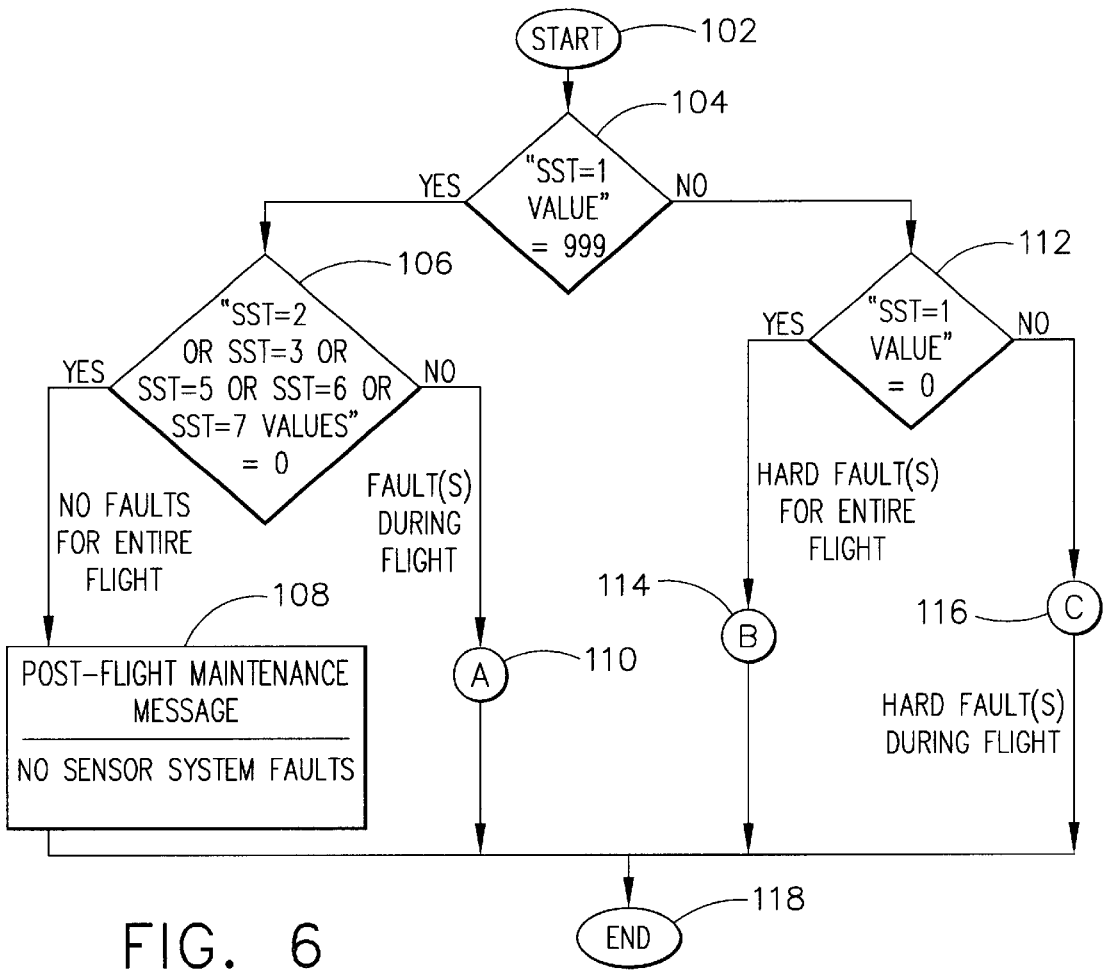
FIG. 6 is a flow chart for a pattern detection algorithm.
Figure 7:
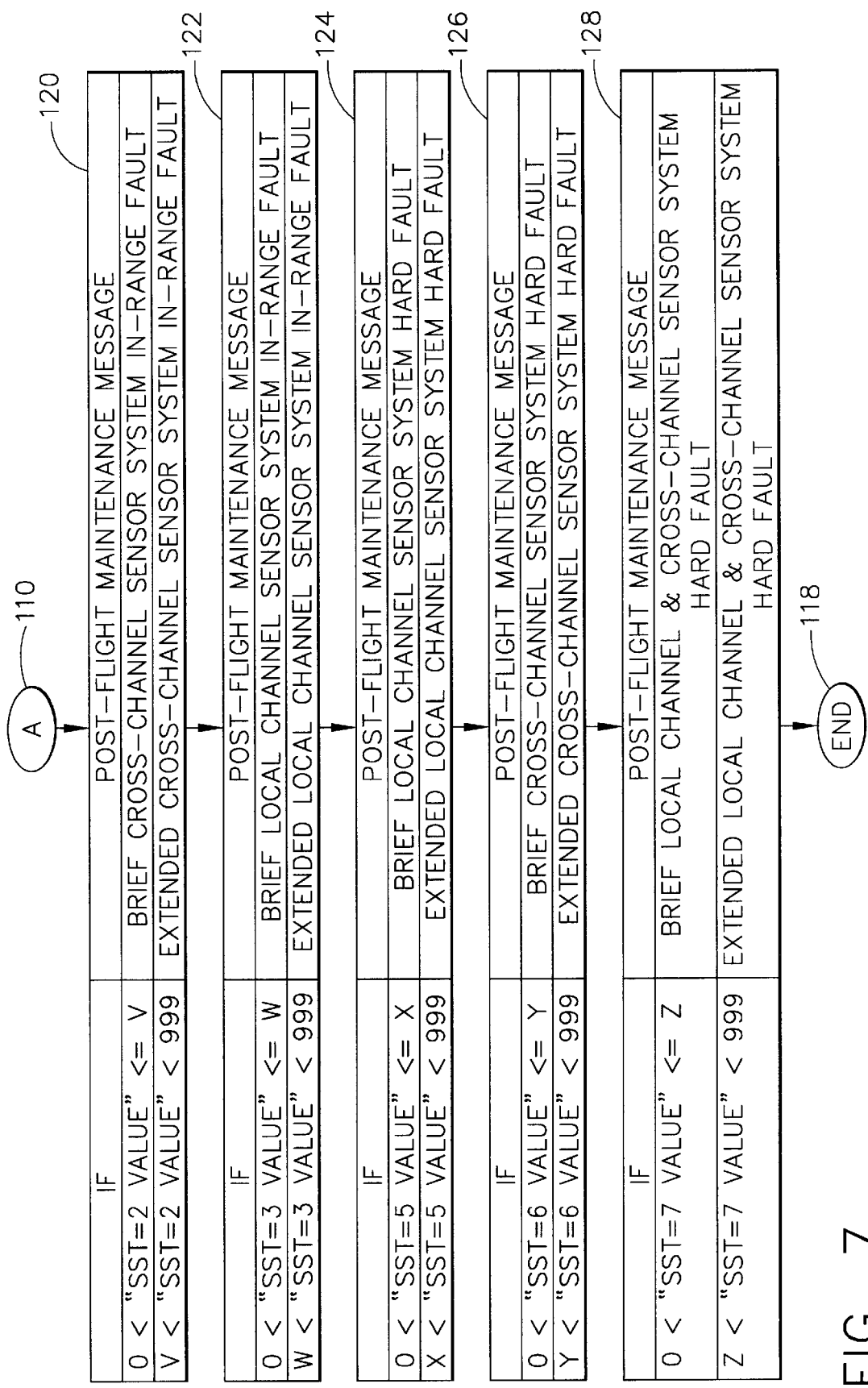
FIG. 7 is a continuation of the flow chart shown in FIG. 6.

FIGS. 6–9 illustrate process steps for pattern detection algorithm 32 for determining failure conditions shown in Table V. Four possible failure scenario paths are shown in FIG. 6. Specifically, after starting operation 102, and if the SST=1 value is equal to 999 (104), then the other SST values are checked to determine whether any of the values equal zero 106. If the other values are equal to zero, then the post flight message of "No Sensor System Faults" is generated 108. If one or more of the values do not equal zero, then this indicates that one or more faults were generated during the flight and processing continues as illustrated in FIG. 7 (Connector A 110).

Figure 8:
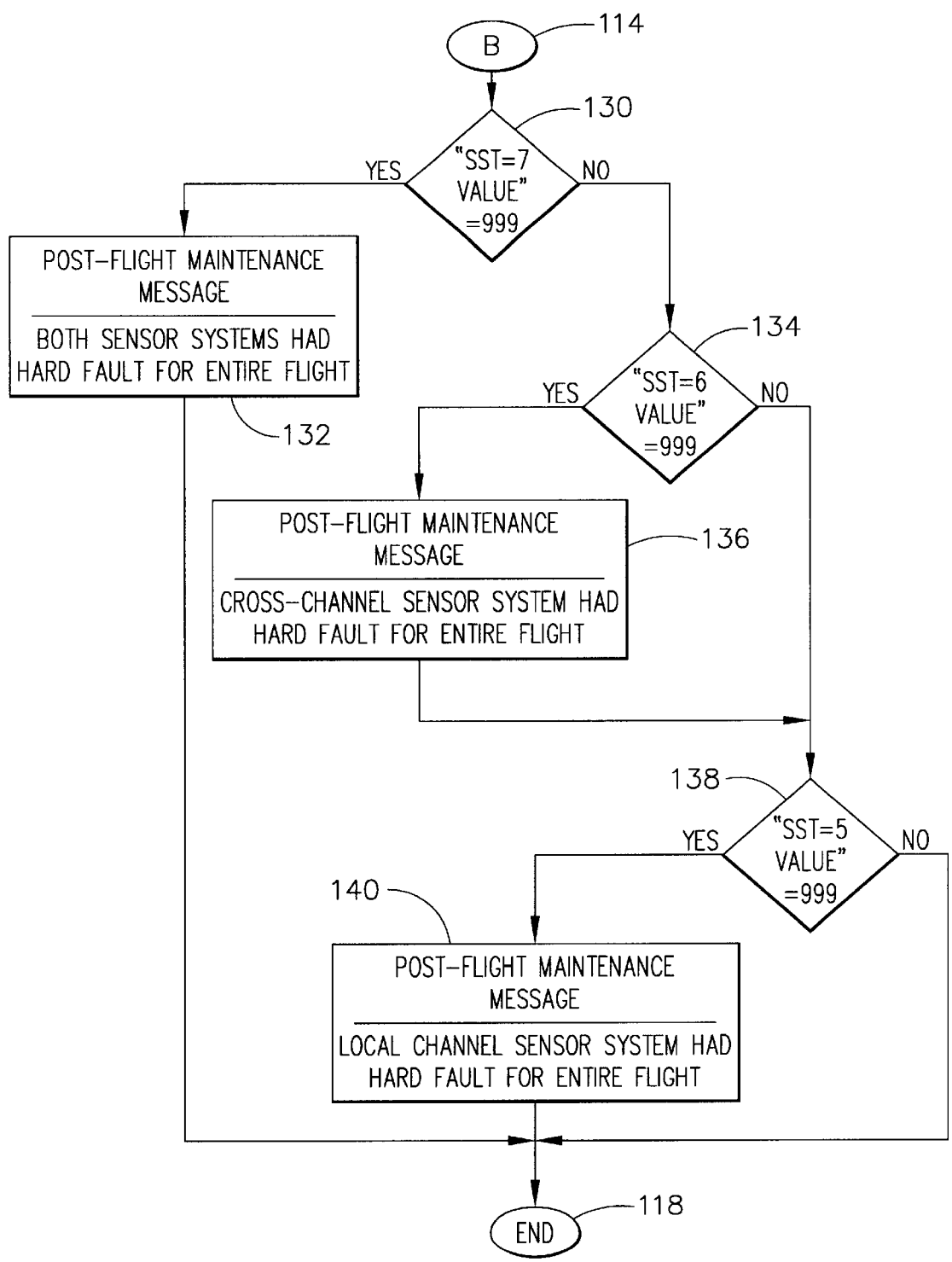
FIG. 8 is a continuation of the flow chart shown in FIG. 6.

Still referring to FIG. 6, and if the SST=1 value is not equal to 999, then the SST=1 value is checked to determine whether it equals zero 112. If the value equals zero, then this indicates that a hard fault existed for the entire flight and processing continues as illustrated in FIG. 8 (Connector B 114). If the value is not equal to zero, then this indicates that a hard fault occurred during the flight, and processing continues as illustrates in FIG. 9 (Connector C 116). Processing ends 118 after completion of step 108, or after completing processing as illustrated in FIGS. 7, 8, or 9, as described below in detail.

Referring now to FIG. 7, logic 120, 122, 124, 126, and 128 detects cases where an intermittent signal causes the SST number time duration value to be greater than 10 seconds. The variable time thresholds V, W, X, Y, and Z are defined based on failure modes of each sensor system. The logic can be structured with multiple time threshold values if more fault trend information is needed in the post-flight maintenance message.

Referring now to FIG. 8, if SST number 7 has a value equal to 999 (130), then the message "Both Sensor Systems Had Hard Fault For Entire Flight" is generated 132. If the SST number 7 does not have a value equal to 999, then SST number 6 is checked to determine whether it has a value equal to 999 (134). If SST number 6 has a value equal to 999, then the message "Cross-Channel Sensor System Had Hard Fault For Entire Flight" is generated 136. Processing proceeds to step 138 after generation of the message at step 136, or if SST number 6 does not have a value of 999. At step 138, SST number 5 is checked to determine whether it has a value of 999. If SST number 5 has a value of 999, then the message "Local Channel Sensor System Had Hard Fault For Entire Flight" is generated 140. If SST number 5 does not have a value of 999, then processing ends 118. Processing also ends after steps 132 and 140. Generally, the processing steps illustrated in FIG. 8 detect hard faults for the entire flight.

Figure 9:
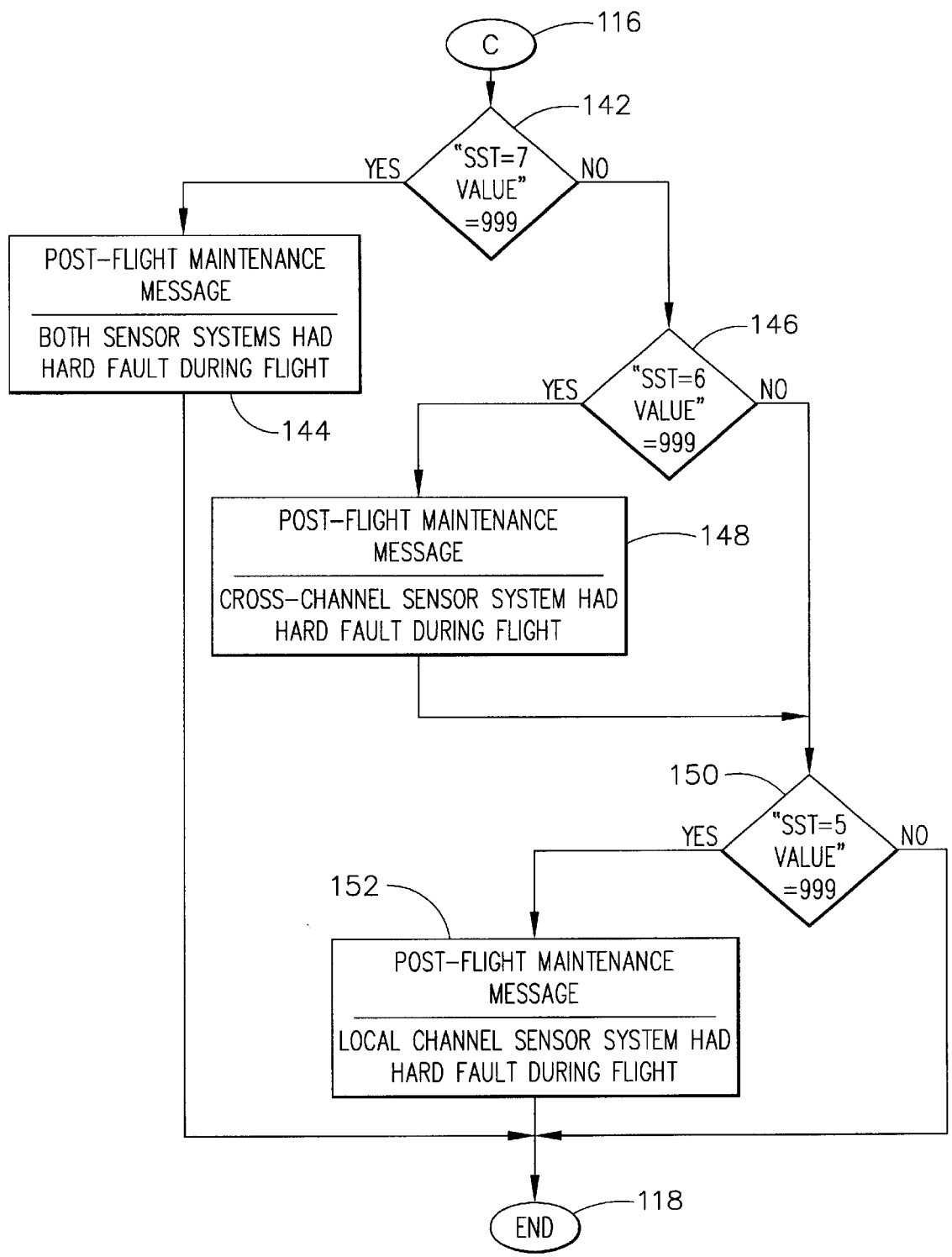
FIG. 9 is a continuation of the flow chart shown in FIG. 6.

Referring now to FIG. 9, if SST number 7 has a value equal to 999 (142), then the message "Both Sensor Systems Had Hard Fault During Flight" is generated 144. If the SST number 7 does not have a value equal to 999, then SST number 6 is checked to determine whether it has a value equal to 999 (146). If SST number 6 has a value equal to 999, then the message "Cross-Channel Sensor System Had Hard Fault During Flight" is generated 148. Processing proceeds to step 150 after generation of the message at step 148, or if SST number 6 does not have a value of 999. SST number 5 is checked to determine whether it has a value of 999 (150). If SST number 5 has a value of 999, then the message "Local Channel Sensor System Had Hard Fault During Flight" is generated 152. If SST number 5 does not have a value of 999, then processing ends 118. Processing also ends after steps 144 and 152. Generally, the processing steps illustrated in FIG. 9 detect hard faults during the flight.

The above described processing results in generation of one or more post-flight maintenance messages indicating failure information. Possible scenarios for failure (i.e., combinations of sensor SST values for a dual sensor system) are summarized below in Table V.

TABLE V

| Scenario | SST Number 1 | 2 | 3 | 5 | 6 | 7 | Failure Information |
|---|---|---|---|---|---|---|---|
| 1 | 999 | 0 | 0 | 0 | 0 | 0 | Both sensor systems stayed non-failed for entire flight |
| 2 | 000 | 0 | 0 | 999 | 0 | 0 | Local channel's sensor system had hard fault for entire flight |
| 3 | 000 | 0 | 0 | 0 | 999 | 0 | Cross-channel's sensor system had hard fault for entire flight |
| 4 | 000 | 0 | 0 | 0 | 0 | 999 | Both sensor systems had hard fault at same time for entire flight |
| 5 | 999 | NNN | 0 | 0 | 0 | 0 | Cross-channel's sensor system had "in-range" fault condition during flight |
| 6 | 999 | 0 | NNN | 0 | 0 | 0 | Local channel's sensor system had "in-range" fault condition during flight |
| 7 | 999 | 0 | 0 | NNN | 0 | 0 | Local channel's sensor system had hard fault condition during flight |
| 8 | 999 | 0 | 0 | 0 | NNN | 0 | Cross-channel's sensor system had hard fault condition during flight |
| 9 | 999 | 0 | 0 | 0 | 0 | NNN | Both sensor systems had hard fault condition at the same time during flight |
| 10 | 999 | 0 | NNN | NNN | 0 | 0 | Local channel's sensor system had "in-range" and hard fault conditions during flight |
| 11 | 999 | NNN | 0 | 0 | NNN | 0 | Cross-channel's sensor system had "in-range" and hard fault conditions during flight |
| 12 | 999 | NNN | NNN | NNN | NNN | NNN | Both sensor systems had "in-range" and hard fault conditions during flight |
| 13 | NNN | 0 | 0 | NNN | 0 | 0 | Local channel's sensor system had hard fault during flight |
| 14 | NNN | 0 | 0 | 0 | NNN | 0 | Cross-channel's sensor system had hard fault during flight |
| 15 | NNN | 0 | 0 | 0 | 0 | NNN | Both sensor systems had hard fault at same time during flight |

Pattern detection algorithm 32 could be combined with the ECU logic that determines the two channels is "in control" of the engine, and could generate a post-flight maintenance message that indicates whether the fault was in Channel A or Channel B, instead of the local channel or the cross-channel.

Although the transition counter logic 54 and time duration table logic 56 are described above in the context of tables such as Tables II, III, and IV, it should be understood that such tables need not be physically generated. Rather, the data represented in such tables is generated by a processor and stored in memory locations (e.g., random access memory). The processor then utilizes the data to perform the operations as described herein. As used herein, the term table is not limited to an actual table as illustrated herein to facilitate representation of the data, but rather refers to capturing the data for processing as described herein.

While the invention has been described in terms of various specific embodiments, those skilled in the art will recognize that the invention can be practiced with modification within the spirit and scope of the claims.

What is claimed is:

1. A method for monitoring a status of a sensor in an aircraft, said method comprising the steps of:
   generating a transition count indicating a number of times a selection status number changes during a flight; and
   generating a time duration value indicating an amount of time the selection status number is in each of its possible states during the flight.

2. A method in accordance with claim 1 wherein generating a transition count indicating a number of times a selection status number changes during a flight comprises the step of monitoring the selection status number for the sensor.

3. A method in accordance with claim 1 wherein generating a time duration value comprises the step of monitoring the selection status number for the sensor.

4. A method in accordance with claim 1 further comprising the step of generating a maintenance message utilizing at least one of the transition count and the time duration value.

5. A method in accordance with claim 4 wherein generating a maintenance message comprises the steps of:
   determining whether the transition counter exceeds a preselected limit; and
   if the preselected limited is exceeded, then generating a maintenance message.

6. A method in accordance with claim 4 wherein generating a maintenance message comprises the steps of:
   executing a post-flight pattern detection algorithm; and
   if a fault pattern is detected, then generating a maintenance message.

7. Apparatus for monitoring a status of a sensor in an aircraft, said apparatus comprising a processor programmed to:
   generate a transition count indicating a number of times a selection status number changes during a flight; and
   generate a time duration value indicating an amount of time the selection status number is in each of its possible states during the flight.

8. Apparatus in accordance with claim 7 wherein to generate a transition count indicating a number of times a selection status number changes during a flight, said processor is programmed to monitor the selection status number for the sensor.

9. Apparatus in accordance with claim 7 wherein to generate a time duration value, said processor is programmed to monitor the selection status number for the sensor.

10. Apparatus in accordance with claim 7 wherein said processor is further programmed to generate a maintenance message utilizing at least one of the transition count and the time duration value.

11. Apparatus in accordance with claim 10 wherein to generate a maintenance message, said processor is further programmed to:
    determine whether the transition counter exceeds a preselected limit; and
    if the preselected limited is exceeded, then generate a maintenance message.

12. Apparatus in accordance with claim 10 wherein to generate a maintenance message, said processor is further programmed to:
   execute a post-flight pattern detection algorithm; and
   if a fault pattern is detected, then generate a maintenance message.

13. Apparatus in accordance with claim 7 wherein said processor is located in at least one of an electronic control unit, an aircraft data acquisition system, a ground-based system, and an aircraft central maintenance system.

* * * * *